United States Patent [19]

Enters et al.

[11] 4,244,427
[45] Jan. 13, 1981

[54] TILLER WITH ROTATABLE TINES AND GUIDING HANDLE

[75] Inventors: Edward W. Enters, Fredonia; Roger J. Bacon, Plymouth, both of Wis.

[73] Assignee: Gilson Brothers Company, Plymouth, Wis.

[21] Appl. No.: 916,483

[22] Filed: Aug. 19, 1978

[51] Int. Cl.$^2$ ............... A01B 33/02; B62D 51/06
[52] U.S. Cl. ................................ 172/42; 180/19 H
[58] Field of Search .................... 172/42, 43, 125; 180/19 R, 19 S, 19 H

[56] References Cited

FOREIGN PATENT DOCUMENTS

| | | | |
|---|---|---|---|
| 83807 | 6/1920 | Switzerland | 180/19 R |
| 778659 | 7/1957 | United Kingdom | 180/19 R |
| 837269 | 6/1960 | United Kingdom | 180/19 R |
| 877186 | 9/1961 | United Kingdom | 180/19 R |
| 903296 | 8/1962 | United Kingdom | 172/42 |
| 1006439 | 9/1965 | United Kingdom | 172/125 |

OTHER PUBLICATIONS

"MTD Rear Power Tiller", 1977.

*Primary Examiner*—Richard T. Stouffer

[57] ABSTRACT

A rear tined tiller having a guiding handle which is readily adjustable vertically and laterally and wherein adjustment of the guiding handle position may be controlled by a handle position control lever attached to the free end of the guiding handle and readily accessible to the operator. The guiding handle is also supported for pivotal movement through a 180° arc about a vertical pivot axis for storage and transport of the machine. The handle position control lever is also connected to the traction drive and the tine drive mechanisms to interrupt power to both the drive wheels and the tiller tines during adjustment of the guiding handle position. Linkages are further provided for shifting the traction drive mechanism between forward and reverse and the tine drive mechanism between a neutral mode and a driving mode, the shifting linkages including a single control lever and providing for shifting of the tine drive mechanism to the neutral mode unless the traction drive mechanism is in the forward driving mode.

31 Claims, 10 Drawing Figures

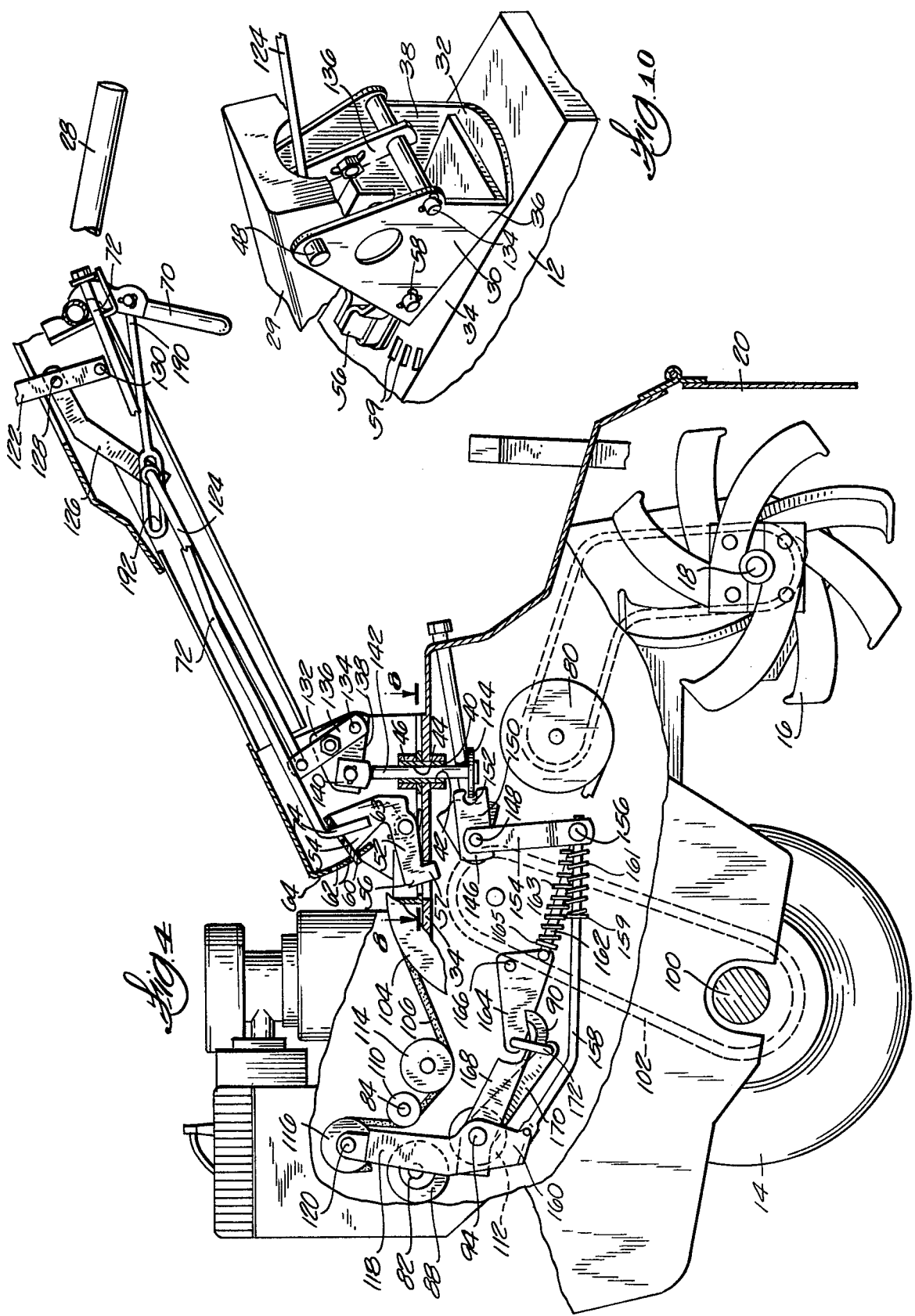

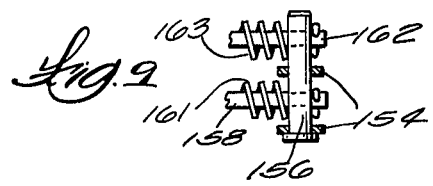
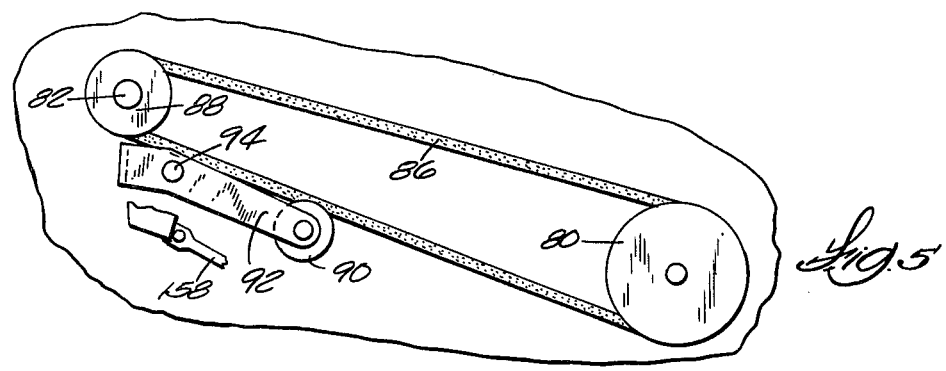
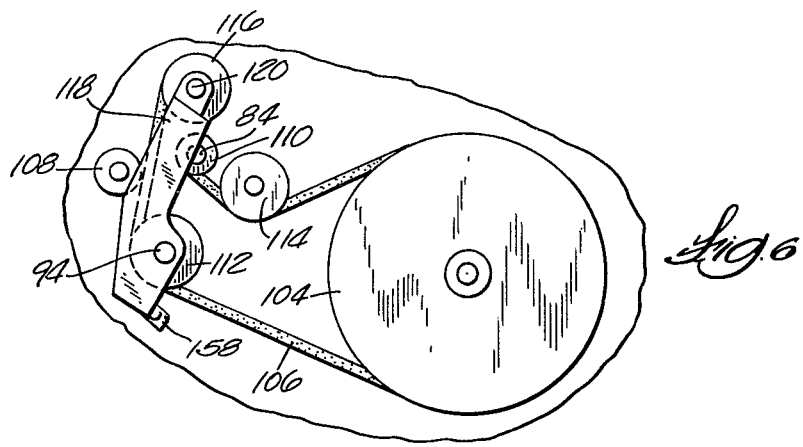
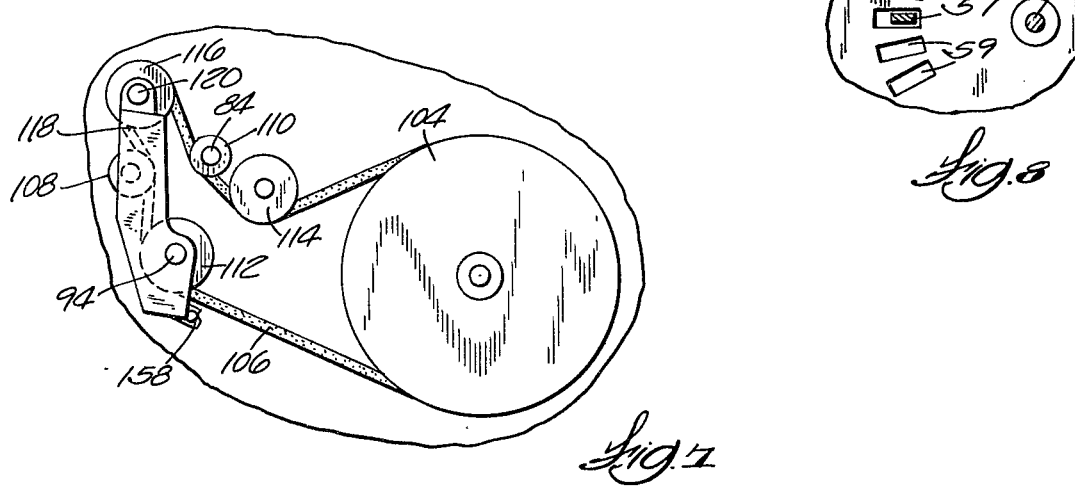

TILLER WITH ROTATABLE TINES AND GUIDING HANDLE

BACKGROUND OF THE INVENTION

The present invention relates to rotary tillers and more particularly to a rear tined tiller having a guiding handle and a construction for mounting the guiding handle to permit vertical and horizontal adjustment of the guiding handle and having a single lever for controlling the wheel and tine drives.

Rear tined tillers generally include a frame supported by a pair of driving wheels and tilling tines rotatably mounted rearwardly of the driving wheels. An engine is mounted on the frame and is operable to drive both the driving wheels and the rotatable tines. A guiding handle is connected to the frame and extends rearwardly. During operation, the machine operator walks behind the tiller controlling its direction with the guiding handle. To facilitate control of the tiller, it is desirable that the guiding handle be adjustable vertically and horizontally with respect to the direction of motion of the tiller. Horizontal adjustment of the guiding handle permits the operator to walk on one side of the path of movement of the tiller such that he does not walk on the tilled soil and also permits operation of the tiller alongside buildings and close to standing crops.

Some rear tined tillers having an adjustable position guiding handle are known. However, though the position of the guiding handle of such machines is adjustable, the adjustment mechanism is not readily accessible to the machine operator and requires him to approach the tilling tines. Accordingly, if the machine is inadvertently left in operation, adjustment of the guiding handle position can be dangerous to the operator.

Rear tined tillers also commonly have two drive systems, a traction drive system and a tine drive system. The traction drive system determines the tiller operating speed, and the tines of rear tined tillers rotated at a higher speed to pulverize the soil. Accordingly, rotation of the tiller tines tends to pull the tiller out of the operator's grasp unless the tiller is braked by engagement of the traction drive mechanism. Consequently, for tillers having power driven wheels, it is desirable to have the traction drive mechanism engaged whenever the tiller is driven such that the driven wheels will restrain the tiller. It is also desirable that the tine drive mechanism be precluded from engagement whenever the tiller is driven in reverse in order to protect the operator.

SUMMARY OF THE INVENTION

The rear tined tiller of the invention includes a frame, wheels supporting the frame for movement on the ground, a prime mover supported by the frame, a plurality of tilling tines rotatably supported by the frame and driven by the prime mover, the tines engaging the ground for tilling the soil, a guiding handle, means for connecting the guiding handle to the frame and for supporting the guiding handle for pivotal movement with respect to a generally vertical axis and a generally horizontal axis, and means for releasably restraining the guiding handle against pivotal movement. The restraining means includes a latch member movably connected between the frame and the handle for restraining the handle against pivotal movement with respect to the frame.

One of the features of the invention is the provision of means for connecting the guiding handle to the frame and for supporting the guiding handle for rotation in at least a 180° arc such that the machine can be conveniently stored and such that the machine operator can walk behind the machine and guide the machine when the machine is driven in reverse.

Another of the features of the invention is the provision of a movable latch member movably connected between the tiller frame and the guiding handle and positionable in a first position wherein the guiding handle is restrained against movement with respect to the frame and is movable to a second position wherein the guiding handle is pivotable about a horizontal axis and movable to a third position wherein the guiding handle is pivotable about a horizontal axis and a vertical axis.

Another of the features of the invention is the provision of a control lever attached to the free end of the guiding handle for use in controlling the position of the guiding handle, the control lever being readily accessible to the operator.

Another of the features of the invention is the provision of a control lever connected to the drive wheel and the tiller tine drive mechanism to interrupt power to both the drive wheels and the tiller tines during adjustment of the position of the guiding handle.

Another of the features of the invention is the provision of means for connecting a shift lever mounted on the guiding handle to the drive wheel and to the tiller drive mechanism, the connecting means including a vertical shaft and wherein the guiding handle is pivotal around the axis of the vertical shaft.

Another of the features of the invention is the provision of traction drive means for selectively drivingly connecting the engine to the drive wheel for rotatably driving the drive wheel, tine drive means for selectively drivingly connecting the engine to the tilling tines for rotatably driving the tilling tines, and drive control means connected to the traction drive means and to the tine drive means for precluding driving connection of the tilling tine with the engine unless the traction drive means is drivingly connected with the engine in forward driving engagement.

Another of the features of the invention is the provision of a traction drive means shiftable from a forward driving position to a neutral driving position to a reverse driving position, and a drive control means which includes a shift lever connected to the traction drive means for shifting the traction drive means from the forward driving position to the neutral driving position and to the reverse driving position, and the shift lever being connected to the tine drive means for shifting the tine drive means to a drive mode when the traction drive means is shifted to the forward driving position and for shifting the tine drive means to a netural mode when the traction drive is shifted to the neutral driving position or the reverse driving position.

Other features and advantages of the invention will become apparent to those skilled in the art upon reviewing the following detailed description, the drawings and the appended claims.

BRIEF DESCRIPTION OF THE DRAWINGS

FIG. 4 is an enlarged side elevation view of the rear tined tiller shown in FIG. 1 with portions broken away to illustrate the tiller and traction drive mechanisms and the tiller handle construction;

FIG. 5 is a partial view of the tine drive mechanism shown in FIGS. 3 and 4;

FIG. 6 is a partial view of the wheel drive mechanism shown in FIGS. 3 and 4 and showing the wheel drive belt in its forward driving mode;

FIG. 7 is a view similar to that shown in FIG. 6 but showing the belt in a rearward driving mode;

FIG. 8 is a cross section view taken along lines 8—8 in FIG. 4;

FIG. 9 is a plan view of portions of the tine and traction drive control means shown in FIG. 4; and FIG. 10 is an enlarged perspective view of the guiding handle support means shown in FIGS. 1, 2 and 4.

Figure 1:
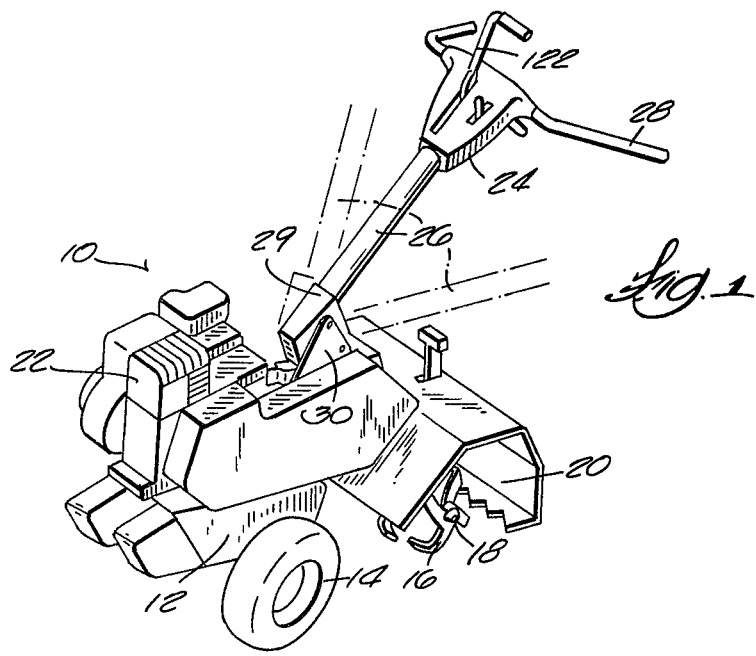
FIG. 1 is a perspective view of the rear tined tiller embodying the invention and illustrating a pivotable guiding handle for the rear tined tiller, alternative positions of the guiding handle being shown in phantom.

Before explaining at least one embodiment of the invention in detail, it is to be understood that the invention is not limited in its application to the details of construction, and the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

The rear tined tiller 10 of the invention is illustrated in FIG. 1 and generally includes a frame 12 supported by a pair of ground engaging wheels 14. The frame 12 rotatably supports a plurality of tilling tines 16 supported on a rotatably driven tine drive shaft 18. The tines 16 are enclosed within a housing 20 and are mounted rearwardly of the wheels 14 for tilling the soil. The frame 12 also supports an engine 22 drivingly connected to the wheels 14 and also drivingly connected to the tiller tine drive shaft 18 for driving the tines 16 in a manner to be described. The rear tined tiller 10 also includes a guiding handle 24 connected to the frame 12 for permitting the tiller operator to guide the tiller. The guiding handle 24 generally includes a tubular handle shaft 26 having a transverse handlebar 28 attached to its upwardly extending free end. The lower end of the tubular handle shaft 26 of the guiding handle 24 is attached to a pivotably supported frame 29 in turn supported from the frame 12 by a pivotal connecting bracket 30. The guiding handle 26 is supported by the pivotal connecting bracket 30 for pivotal movement about both a horizontal pivot axis and for pivotal movement about a vertical pivot axis to thereby permit vertical and lateral adjustment of the position of the guiding handle 24.

Figure 2:
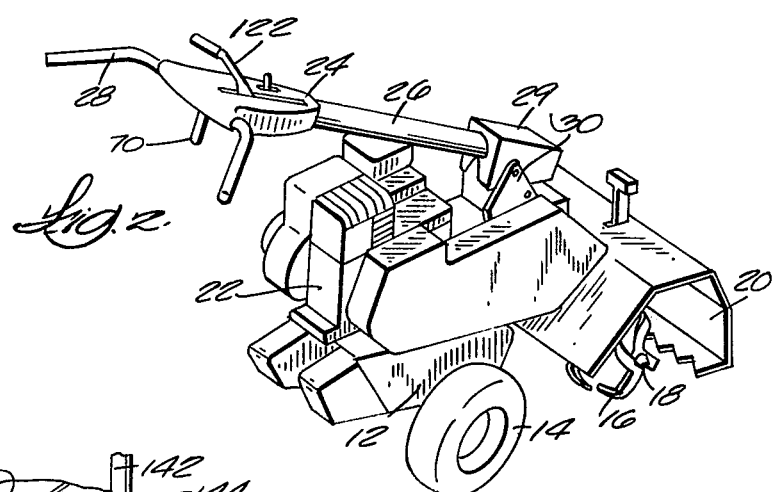
FIG. 2 is a perspective view of the rear tined tiller similar to FIG. 1 but showing the guiding handle pivoted 180° about a vertical axis.

As shown in FIG. 2, the guiding handle is pivotable about the vertical axis in an arc of at least 180°. When the guiding handle has been pivoted to the position shown in FIG. 2, the tiller provides a more compact unit for storage, and the tiller can also be more easily transported because the tiller drive mechanism, to be described hereinafter, drives the tiller in reverse at a speed generally twice that of the forward driving speed. Pivotal movement of the tiller handle to the rearward driving position permits the operator to follow the tiller when it is driven in reverse, and thus facilitates transport of the tiller.

The pivotal supporting bracket 30 includes a generally horizontal bottom wall 32 (FIG. 4) having a planar bottom surface supported on a generally planar horizontal pivot plate 34 of the frame 12. The pivotal connecting bracket 30 also includes a pair of planar spaced apart parallel triangular side plates 36 and 38, which extend generally vertically and upwardly from the horizontal bottom wall 32. The pivotal supporting bracket 30 is supported for pivotal movement about a vertical axis by a threaded sleeve 40 housed within a bore in the horizontal pivot plate 34. The bottom wall 32 of the supporting bracket 30 is restrained against the horizontal plate portion 34 of frame 12 by a nut 46 threadably received on the upper end of the threaded sleeve 40 and a nut 42 threadably received on the lower end of the sleeve 40.

The lower end of the guiding handle 24 is supported for pivotal movement about a horizontal axis by a pivot shaft 48 which extends through the pivotably supported frame 29 of the guiding handle and which has opposite ends respectively pivotably supported by the spaced-apart side plates 36 and 38 of the pivotal supporting bracket 30.

Movement of the guiding handle 24 about the horizontal axis of the pivot shaft 48 and pivotal movement of the guiding handle 24 and the bracket 30 about the vertical axis of the sleeve 40 is releasably prevented by a pivotable latch 52 shown in FIGS. 4 and 10. The pivotable latch 52 has a bell crank configuration and includes a pair of angularly disposed lever arms 54 and 56. The pivotable latch 52 is supported for pivotal movement about a horizontal axis generally parallel to the axis of the pivot shaft 48 by pivot pin 58 which extends through the pivotable latch 52 and is pivotably supported at its opposite ends by the respective vertical side plates 36 and 38 of the pivotal connecting bracket 30.

Movement of the guiding handle 24 about the horizontal axis of the bolt 50 is releasably prevented by a pawl 60 which extends from the end of the lever arm 54 and which is received in one of a plurality of vertically spaced apart holes 62 in an end plate 64 of the pivotably supported frame 29 of guiding handle 24. The end plate 64 is transverse to the longitudinal axis of the guiding handle 24 and is concave and curved about an axis generally parallel to the horizontal pivot axis of the guiding handle 24. The end plate 64 includes vertically spaced apart, generally rectangular holes 62 which are selectively brought into alignment with the pawl 60 by pivotal movement of the guiding handle about the axis of the pivot shaft 48.

Movement of the guiding handle 24 about the vertical axis of the sleeve 40 is selectively prevented by a pawl 57 which extends downwardly from the free end of lever arm 56 and extends through a generally rectangular slot in the bottom wall 32 of the support bracket 30 and into a selected one of a plurality of spaced apart arcuately arranged rectangular holes 59 in the planar horizontal pivot plate 34 of the frame 12. The holes 59 are best shown in FIG. 8 as being arranged in an arcuate pattern around the axis of the vertically oriented sleeve 40. Accordingly, pivotal movement of the guiding handle 24 about the vertical axis of the sleeve 40 can adjustably position the pawl 57 in one of the holes 59.

The pivotable latch 52 is biased in a counterclockwise direction as seen in FIG. 4 by a torsion spring 63 surrounding the pivot pin 58. The pivotal latch 52 is biased by the torsion spring 63 such that the pawl 60 will normally engage one of the holes 62 in the end wall 64 of the frame 29 to thereby prevent vertical movement of the guiding handle 24 and also, will normally cause the pawl 57 to be engaged with one of the rectangular holes 59 in the planar pivot plate of the frame 12 such that the guiding handle 24 will be restricted against pivotal movement about the vertical axis of the sleeve 40.

Movement of the pivotal latch 52 to a position wherein the guiding handle position can be adjusted, is effected by a control handle 70 and an actuating rod 72 connecting the control handle 70 to the pivotal latch 52. The connecting rod 72 includes a hook or angular portion 74 at its lower end connected to the lever arm 54 of the latch 52. The opposite end of the connecting rod 72 is attached to the control handle 70. The control handle 70 has an upper end positioned against and in abutting relationship with the handle bar 28 and the other end of the control handle 70 extends downwardly and is intended to be grasped by the operator. The end of the connecting rod 72 is connected to the control handle 70 intermediate the ends of the control handle but adjacent its upper end and such that rearward movement of the lower end of the control handle 70 causes the control rod 72 to be pulled upwardly and in turn causing pivotal movement of the control lever 52.

Movement of the control handle 70 rearwardly to a first position, causes sufficient pivotal movement of the latch 52 to cause the pawl 60 to move out of the hole 62 in the end wall 64 to thereby permit pivotal movement of the guiding handle 24 about the axis of the pivot shaft 48, but such movement of the latch 52 does not cause sufficient upward movement of the pawl 57 to remove pawl 57 from engagement in the rectangular opening 59. Accordingly, when the control handle 70 is moved to this first position, the vertical position of the guiding handle can be varied, but the guiding handle 24 is not laterally movable. Continued rearward movement of the control handle 70 to a second position will casue further pivotal movement of the latch 52 in a clockwise direction as seen in FIG. 4 and upward movement of the pawl 57 out of the selected hole 59 whereby the guiding handle 24 can be pivoted about the vertical axis of the sleeve 40 to thereby permit lateral adjustment of the position of the guiding handle 24 and to permit rotation of the handle 24 180° to the position shown in FIG. 2 for transport or storage of the tiller.

As shown in FIG. 2, the pivotal support bracket 30 supports the guiding handle for rotation of at least 180° about the axis of the sleeve 40.

Figure 3:
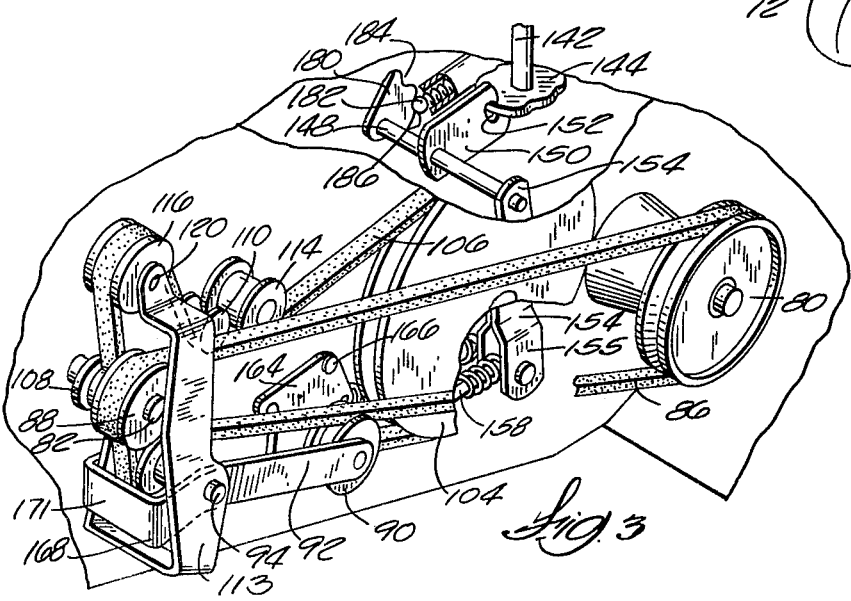
FIG. 3 is an enlarged partial perspective view of the tiller and traction drive mechanisms of the rear tined tiller shown in FIG. 1 and with portions broken away in the interest of clarity.

The engine 22 is operably drivingly connected to the tiller tines 16 on the tiller tine shaft 18 in the manner shown in FIGS. 3, 4 and 5. The tiller tine shaft 18 is connected through a chain drive 79 shown in phantom in FIG. 4, to a tiller drive pulley 80 in turn driven by the engine 22. The engine 22 has a horizontal crankshaft 82 and a horizontal camshaft 84, and one end of each of the crankshaft 82 and camshaft 84 extends outwardly from the engine 22 for supporting respective pulleys thereon. As shown in FIGS. 3 through 5, the tiller drive pulley 80 is driven by a belt 86, and the belt 86 is in turn driven by a pulley 88 supported on the outer end of the crankshaft 82. Driving engagement of the belt 86 with the tiller drive pulley 80 is controlled by a tensioning pulley 90 supported for movement toward and away from the belt 86 by a pivotable lever arm 92. The lever 92 is pivotable about a pivot shaft 94 such that the tensioning pulley 90 is movable between a position wherein it is forced against the belt causing the belt 86 to drive the pulley 80 and a second position wherein the tensioning pulley 90 is moved away from the belt 86 such that the pulley 80 is not driven by the belt 86.

Referring to FIG. 4, the drive wheels 14 are rotatably mounted on an axle 100 and are rotatably driven by a drive chain 102 shown in phantom. The drive chain 102 is in turn driven by a traction drive pulley 104 (FIG. 6) driven by the engine 22 through a belt 106. The engine crankshaft 82 also supports a reverse driving pulley 108 spaced inwardly from the pulley 88. The engine camshaft 84 similarly supports a forward driving pulley 110. The belt 106 is shown in FIGS. 6 and 7 as being reeved over the wheel driving pulley 104 and is supported to selectively contact the forward and reverse driving pulleys 108 and 110. The belt 106 is further supported by a pair of idler pulleys 112 and 114. The wheel drive belt 106 is selectively and alternatively driven by the forward drive pulley 108, or the reverse drive pulley 110, such that the wheel drive pulley 104 is driven either in a counterclockwise direction as seen in FIG. 6 wherein the rear tined tiller is driven forwardly or in a clockwise direction as seen in FIG. 7 wherein the tiller is driven rearwardly. It should be noted that the engine crankshaft 82 rotates at a speed twice that of the camshaft 84. Accordingly, the tiller is driven in reverse at approximately twice the speed as it is driven in forward. Such selective and alternative engagement of the wheel drive belt with either the forward or reverse drive pulley 108 and 110, is provided by a tensioning pulley 116 supporting the wheel drive belt 106 and in turn supported by a bracket 118. As best shown in FIGS. 6 and 7, the tensioning pulley 116 is supported by the bracket 118 for movement from a rearward position (shown in FIG. 6) wherein the the wheel drive belt 106 is moved into engagement with the reverse drive pulley 110 on the cam shaft 84 and to a forward position (shown in FIG. 7) wherein the wheel drive belt 106 is moved into engagement with the forward drive pulley 108 supported by the crankshaft 82. The bracket 118 supporting the tensioning pulley 116 extends vertically and is elongated and pivotably supported intermediate its opposite ends by the pivot shaft 94 also supporting the bracket 92. The upper end of the bracket 118 includes a pivot shaft 120, rotatably supporting the tensioning pulley 116.

The guiding handle 24 supports a shift lever 122 which is functional to cause shifting of the traction drive mechanism between forward, reverse and neutral driving modes and is also functional to cause simultaneous shifting of the tiller tine drive mechanism between a driving mode and a neutral mode. More specifically, the shift lever 122 is functional to cause shifting of the traction drive mechanism into forward, and simultaneous shifting of the tiller drive mechanism into forward, and the tiller drive cannot be shifted into forward without simultaneously shifting the traction drive into the forward driving mode. The shift lever 122 is also functional to shift the tiller tine driving mechanism to the neutral driving mode whenever the wheel drive is shifted to neutral or into reverse. Accordingly, the tiller tines are positively disengaged unless the tiller is driven forwardly.

The shift lever 122 is shown in FIG. 4 as being pivotably supported at its lower end by a pivot pin 130 and is connected intermediate its opposite ends to a shift rod 124 by an angular link 126. The angular link is pivotably connected to one of its ends by a pivot pin 128 to the shift lever 122, intermediate the ends of the shift lever 122. The rod 124 is housed within the tubular handle shaft 26 and is connected at its lower end to a pivotable lever assembly 132. The pivotable lever assembly 132 is in turn supported by a pivot pin 134 for pivotal movement about a horizontal axis. The pivot pin 134 is supported at its opposite ends by the planar side walls 36 and 38 of the pivotal support bracket 30. The lever assembly 132 includes a lever arm 136 having a lower end supported by the pivot pin 134 and the upper end connected to the end of the rod 124. The lever assembly 132 also includes a lever 138 supported for pivotal movement about the pivot pin 134 and connected to the lever 136 for pivotal movement with lever 136. The lever 138 includes a free end 140, opposite that end pivotably supported by the pivot pin 134, and connected to the upper end of a vertically movable shaft 142. The vertical shaft 142 extends through a central vertical bore 44 in the sleeve 40, and the shaft 142 has a lower end extending through the horizontal pivot plate 34 of the frame 12. The lower end of the shaft 142 rigidly supports a circular disc 144 thereon, the circular disc 144 defining a plane perpendicular to the longitudinal axis of the shaft 142.

The tine and traction drive control mechanism also includes a lever assembly 146 connected to both the belt tensioning pulley 90 and the tensioning pulley 116 and functioning to simultaneously control the relative positions of both pulleys in response to shifting movement of the shift lever 122. The lever assembly 146 includes a horizontal pivot pin 148 supported at its opposite ends by the frame 12, and further includes a lever 150 having one end rigidly attached to the pivot pin 148 and an opposite end, including a circular slot 152 therein, the slot 152 being intended to engage the periphery of the circular disc 144. The lever assembly 146 also includes a lever 154 having one end rigidly attached to the pin 148 and extending downwardly from the pin 148.

Shifting movement of the shift lever 122 causes longitudinal movement of the control rod 124, in turn causing pivotal movement of the lever assembly 132 about the pivot shaft 134. Such pivotal movement of the lever assembly 132 causes the lever 140 to move the vertical shaft 142 vertically, thereby causing the circular disc 144 to cause pivotal movement of the lever 150 of the lever assembly 146. The downwardly extending lever 154 and the lever 150 are both rigidly attached to the pivot shaft 148 such that pivotal movement of the lever 150 in response to vertical movement of the circular disc 144 causes arcuate movement of the downwardly extending lever 154, such that its lower end moves forwardly and rearwardly as seen in FIG. 4. Referring to FIG. 3, the lower end of the lever 154 is shown as including a yoke portion 155 having a shaft 156 extending therethrough, the shaft 156 supported by the yoke portion 155 for movement forwardly and rearwardly in response to pivotal movement of lever 150. The shaft 156 is connected to an angular rod 158, the angular rod having one end connected to the shaft 156 and an opposite end pivotably connected to the lower end 160 of the bracket 118. More specifically, the angular rod 158 includes one end slidably positioned in a bore in the shaft 156 as shown in FIG. 9. A kotter key extends through an end of the rod 158 to prevent the rod from being withdrawn from the bore in the shaft 156. The angular rod is surrounded by a restraining collar 159, and a coil spring 161, surrounding the angular rod 158, is disposed between the restraining collar 159 and the shaft 156. Arcuate movement of the lever 154 will thus cause the angular rod 158 to pivot the bracket 118 about the pivot shaft 94. Accordingly, the tensioning pulley 116 will move the belt 106 into engagement with either the forward drive pulley 108 or the reverse drive pulley 110. The lower end of the lever 154 is also connected by means of shaft 156 to a push-pull rod 162 in turn connected to a triangular lever 164. The triangular lever 164 is pivotably supported by a pivot shaft 166 connected to the frame 12. Like the angular rod 158, the push-pull rod 162 has one end slidably received through a bore in the shaft 156 and is surrounded by a coil spring 163 compressed between a restraining collar 165 and shaft 156. The push-pull rod 162 is prevented from being withdrawn from the bore in the shaft 156 by a cotter key shown in FIG. 9. During operation, when the lower end of lever 154 is caused to move forwardly, the shaft 156 applies a compressive force on the coil spring 163 which in turn acts on restraining collar 165 to force push-pull rod 158 toward the triangular lever 164. When the lever 154 is moved rearwardly, as seen in FIG. 4, the shaft 156 acts against the cotter key extending through rod 162 thereby pulling rod 162 forwardly.

The tine drive tensioning pulley 90 (shown in FIG. 5) is supported by a lever arm 92 of a compound lever bracket 168. The compound lever bracket 168 further includes a second lever arm 170 integrally connected to the lever arm 92 by a bight portion 171 (FIG. 3), and the lever arm 170 lies in a plane parallel but spaced from the lever arm 92. The compound lever bracket 168 is supported for pivotal movement about the pivot shaft 94, and the second lever arm 170 is connected by a connecting rod 172 to one end of the triangular lever 164. Forward movement of the lower end of the lever 154 causes the push-pull rod 162 to cause the triangular lever 164 to pivot about the pivot shaft 166 in the counterclockwise direction as seen in FIGS. 3 and 4, whereby the connecting rod 172 pulls upwardly on the second lever arm 170. Accordingly, the lever arm 92 of the compound lever bracket 168 is moved upwardly and, the tensioning pulley 90 is moved into engagement with the tiller drive belt 86.

Referring to FIG. 4, when the shift lever 122 is moved to the forward drive position, the connecting rod 124 is moved downwardly causing pivotal movement of the lever assembly 132 and downward movement of the shaft 142. Such downward movement of the shaft 142 and the circular disc 144 causes pivotal movement of the lever 150 and consequent pivotal movement of the downwardly extending lever 154 of the lever assembly 156, causing the lower end of the lever 154 to move forwardly. Such forward movement of the lower end of the lever 154 causes the angular rod 158 to push the lower end 160 of the bracket 118 forwardly and to cause a rearward movement of the tensioning pulley 116, such that the wheel drive belt 106 engages the pulley 110 on the camshaft 84. Accordingly, the belt 106 will be driven by the pulley 110, and the traction drive mechanism will drive the tiller forwardly. When the traction drive mechanism is shifted to the forward driving position, the tiller tine drive mechanism is also shifted to the drive mode. As the lower end of the lever 154 moves forwardly, the push-pull rod 162 also causes the triangular lever 164 to pivot in a counterclockwise direction as seen in FIG. 4, thereby causing the connecting rod 172 to be pulled upwardly causing the lever arm 170 and the lever 92 of the compound lever bracket 168 to be pulled upwardly such that the tensioning pulley 90 engages the tiller tine drive belt 86.

When the shift lever 122 is moved rearwardly from the forward driving shift lever position to a neutral position, the control rod 124 is pulled upwardly and the lever assembly 132 pulls upwardly on the shaft 142 causing lever 150 and shaft 148 to pivot in a counterclockwise direction. The lower end of the lever 154 is accordingly caused to move rearwardly as seen in FIGS. 3 and 4. The shaft 156 causes rearward movement of both angular rod 158 and push-pull rod 162. Rearward movement of the angular rod 158 pivots the bracket 118 to the position shown in FIG. 4 wherein the tensioning pulley 116 is positioned intermediate its forward and reverse positions, and neither of the pulleys 108 or 110 drive the belt 106. Rearward movement of the push-pull rod 162 causes counterclockwise movement of the triangular lever 164 about pivot pin 166 and downward movement of the connecting rod 172. Accordingly, lever arms 170 and 92 of lever bracket 168 are pivoted downwardly causing tensioning pulley 90 to move downwardly to a disengaged position.

The tine and traction drive shift mechanism described is releasably held in the forward driving mode and neutral modes by a detent mechanism including a detent lever 180 (FIGS. 3 and 4) rigidly attached to the pivot pin 148, and including a spring biased detent ball 182 releasably engaging notches 184 and 186 in the end of the detent lever 180. The detent ball 182 is biased into engagement with the notches 184 and 186 by a coil spring 188 and is functional to releasably prevent rotation of the pivot pin 148 and consequent movement of lever 154 rigidly secured thereto.

When the shift lever 122 is moved rearwardly from the neutral shift lever position to the reverse shift lever position, the control rod 124 is pulled upwardly and the lever assembly 132 pulls upwardly on shaft 142 causing further pivotal movement of lever 150 and shaft 148 in a counterclockwise direction. The lower end of lever 154 accordingly is caused to move rearwardly resulting in additional rearward movement of angular rod 158. Such rearward movement of angular rod 158 causes the bracket 118 to pivot in a counterclockwise direction to the position shown in FIG. 7 whereby the tensioning pulley 116 forces belt 106 to engage the pulley 108, in turn driven by the crankshaft 82 such that the traction drive mechanism drives the tiller in reverse.

Referring to FIG. 4, the guiding handle control lever 70 is also connected to the tine and traction drive shift mechanism. If the shift lever 122 is in the forward driving position, rearward movement of the control lever 70 to permit pivotal movement of the guiding handle causes the shift lever 122 to be shifted to the neutral position so that the tine and traction drive mechanisms are shifted to neutral. A linkage 190 is pivotally connected at one end to the control lever 70 intermediate the opposite ends of the control lever 70. The other end of linkage 190 extends into the tubular shaft 26 and includes an elongated slot 192. A transverse end of the rod 124 extends through the slot 192 and is connected to the end of the angular linkage 126 extending between and connecting shift lever 122 and rod 124. When the shift lever 122 is moved forwardly from the neutral position shown in FIG. 4 to a forward drive position, the transverse end of rod 124 will then be positioned against the end of the slot 192 at the extreme end of the linkage 190. If the control lever 70 is then pulled rearwardly to permit adjustment of the position of the guiding handle 24, the linkage 190 will pull rod 124 longitudinally upwardly and will cause the angular linkage 126 to push the shift lever into the neutral position whereby the tine and traction drive mechanism will be shifted to the neutral driving mode.

We claim:

1. A rear tined tiller comprising:
   a rigid frame,
   a wheel supporting the frame for movement on the ground,
   a prime mover supported by the frame and fixed to said frame,
   a plurality of tilling tines rotatably supported by said frame and driven by said prime mover, said tines engaging the ground for tilling,
   a guiding handle,
   means for connecting said guiding handle to said frame and for supporting said guiding handle for pivotal movement with respect to said frame and with respect to a generally vertical axis in an arc of more than 90° and for pivotal movement about a horizontal axis, and
   latch means for releasably restraining said guiding handle against pivotal movement, said latch means including a movable member supported by one of said frame and said handle, said movable member being movable from a first position wherein said guiding handle is restrained against pivotal movement to a second position wherein said guiding handle is pivotable with respect to one of said axes, and a third position wherein said guiding handle is pivotable around both said generally vertical axis and said generally horizontal axis, and wherein said movable member includes a first lever arm selectively engageable with said frame and a second lever arm selectively engageable with said guiding handle for releaseably restraining said guiding handle against pivotal movement when said movable member is in said first position.

2. A rear tined tiller as set forth in claim 1 and wherein said guiding handle includes opposite ends, one of said ends being connected to said frame and a latch control lever being connected to the other of said ends, said latch control lever being movable between a first lever position, a second lever position and a third lever position and further including a movable connecting rod connected between said control lever and said movable member for transmitting movement of said latch control lever to said movable member whereby said movable member is moved to said first position when said latch control lever is in said first lever position, said movable member is moved to said second position when said latch control lever is in said second lever position, and said movable member is moved to said third position when said latch control lever is moved to said third lever position.

3. A rear tined tiller as set forth in claim 1 wherein said means for connecting said guiding handle to said frame and for supporting said guiding handle includes a handle support means for supporting said guiding handle for rotation about a generally horizontal axis, said handle support being connected to said frame for rotation about a generally vertical axis and in an arc of at least 180°.

4. A rear tined tiller comprising:
a rigid frame,
a wheel supporting the frame for movement on the ground,
a prime mover supported by the frame and fixed to the frame,
a plurality of tilling tines rotatably supported by said frame, said tines engaging the ground for tilling,
means for selectively drivingly connecting said prime mover to said tilling tines and to said wheel for driving said tilling tines and said wheel,
means for controlling selective driving connection of said prime mover to said tilling tines and to said wheel,
a guiding handle having opposite ends,
means for connecting one of said ends of said guiding handle to said frame and for supporting said guiding handle for pivotal movement with respect to a generally vertical axis and for pivotal movement about a horizontal axis,
latch means for releasably restraining said guiding handle against pivotal movement with respect to said frame, said latch means including a movable member movably connected between said frame and said handle for restraining said handle against pivotal movement with respect to said frame, said movable member being movable from a first latch position wherein said guiding handle is restrained against pivotal movement and a second position wherein said guiding handle is pivotal,
means for moving said movable member from said first latch position to said second latch position, and
means for connecting said movable member and said means for controlling selective driving connection of said prime mover to said tilling tines and to said wheel and for disengaging said prime mover from said tilling tines and from said wheel upon movement of said movable member from said first position to said second position.

5. The rear tined tiller set forth in claim 4 wherein said prime mover comprises an engine including a projecting crankshaft and a projecting camshaft and wherein said means for drivingly connecting includes a belt drivingly connected to said wheel for driving drive wheel, a first pulley supported by said crankshaft and rotatably driven by said crankshaft, a second pulley supported by said camshaft and rotatably driven by said camshaft, a tensioning pulley supporting said belt and movable between a first position wherein said belt engages said first pulley and is driven by said first pulley to a second position wherein said belt engages said second pulley and is driven by said second pulley.

6. The rear tined tiller set forth in claim 5 wherein said means for selectively drivingly connecting further includes a flexible driving member for selectively driving said tilling tines, and movable means engageable with said flexible driving member for selectively causing said flexible drive member to drive said tines.

7. The rear tined tiller set forth in claim 6 wherein said means for controlling selective driving connection includes shifting means connected to said tensioning pulley and connected to said movable means, said shifting means being movable between a first shift means position wherein said tensioning pulley is in said first tensioning pulley position and said movable member engages said flexible driving member for selectively causing said flexible drive member to drive said tines, and a second shift member position wherein said tensioning pulley is in said second tensioning pulley position and said movable means is disengaged from said flexible driving member.

8. The rear tined tiller set forth in claim 7 wherein said shifting means includes a generally vertical shaft connected to said shift lever and having a longitudinal axis and movable longitudinally in response to shifting of said shift lever, and a lever assembly connected to said vertical shaft and connected to said first tensioning pulley and to said second tensioning pulley.

9. The rear tined tiller set forth in claim 4 wherein said means for selectively drivingly connecting includes a flexible driving member for selectively driving said tilling tines, and movable means engageable with said flexible driving member for selectively causing said flexible drive member to drive said tilling tines.

10. A rear tined tiller set forth in claim 4 and wherein said means for selectively drivingly connecting said prime mover to said tilling tines and to said wheel comprises traction drive means for selectively drivingly connecting said prime mover to said drive wheel for rotatably driving said drive wheel, and tine drive means for selectively drivingly connecting said prime mover to said tilling tines for rotatably driving said tilling tines, and wherein said means for controlling selective driving connection of said prime mover to said tilling tines and to said wheel includes drive control means connected to said traction drive means and to said tine drive means for precluding driving connection of said tilling tines with said prime mover unless said traction drive means is drivingly connected with said prime mover in forward driving engagement.

11. The self-propelled tiller set forth in claim 10 wherein said traction drive means is shiftable from a forward driving position to a neutral driving position to a reverse driving position, and wherein said drive control means includes a shift lever connected to said traction drive means for shifting said traction drive means from said forward driving position to said neutral driving position and to said reverse driving position, and said shift lever being connected to said tine drive means for shifting said tine drive means to a drive mode when said traction drive means is shifted to said forward driving position and for shifting said tine drive means to a neutral mode when said traction drive is shifted to said neutral driving position or said reverse driving position.

12. The self-propelled tiller set forth in claim 11 wherein said drive control means includes a generally vertical shaft connected to said shift lever and connected to said traction drive means and to said tine drive means, and said generally vertical shaft having a longitudinal axis and movable longitudinally in response to shifting of said shift lever, and wherein said guiding handle is pivotable around said longitudinal axis of said generally vertical shaft.

13. A self-propelled tiller comprising:
a rigid frame,
a drive wheel supporting the frame for movement on the ground,
a guiding handle,
an engine supported by the frame and fixed to the frame,
a plurality of tilling tines supported by the frame and engageable with the ground for tilling,
traction drive means for selectively drivingly connecting said engine to said drive wheel and for alternatively rotatably driving said drive wheel in forward driving engagement and reverse engagement, tine drive means for selectively drivingly connecting said engine to said tilling tines for rotatably driving said tilling tines, and drive control means connected to said traction drive means and to said tine drive means for precluding driving connection of said engine with said tilling tines when said traction drive means drivingly connects said engine with said drive wheel in reverse driving engagement and providing driving connection of said engine with said tilling tines when said traction drive means drivingly connects said engine with said drive wheel in forward driving engagement.

14. The self-propelled tiller set forth in claim 13 wherein said traction drive means is shiftable from a forward driving position to a neutral driving position to a reverse driving position, and wherein said drive control means includes a shift lever connected to said traction drive means for shifting said traction drive means from said forward driving position to said neutral driving position and to said reverse driving position, and said shift lever being connected to said tine drive means for shifting said tine drive means to a drive mode when said traction drive means is shifted to said forward driving position and for shifting said tine drive means to a neutral mode when said traction drive is shifted to said neutral driving position or said reverse driving position.

15. The self-propelled tiller set forth in claim 13 wherein said tine drive means includes a flexible driving member for selectively driving said tines, and movable means engageable with said flexible driving member for selectively causing said flexible drive member to drive said tines.

16. A rear tined tiller comprising:
a frame,
a wheel supporting the frame for movement on the ground,
a prime mover supported by the frame,
a plurality of tilling tines rotatably supported by said frame and driven by said prime mover, said tines engaging the ground for tilling,
a guiding handle,
means for connecting said guiding handle to said frame and for supporting said guiding handle for pivotal movement with respect to said frame and with respect to a generally vertical axis and in an arc of more than 90° and for pivotal movement about a horizontal axis, said guiding handle connecting means including a handle support means for supporting said guiding handle for rotation about a generally horizontal axis, said handle support connected to said frame for rotation about a generally vertical axis and in an arc of at least 180°, and
latch means for releasably restraining said guiding handle against pivotal movement, said latch means including a movable member movably connected between said frame and said handle for restraining said handle against pivotal movement with respect to said frame, said latch means including a first lever arm pivotally supported by said handle support means and selectively engageable with said frame for restraining said handle support means from pivotal movement about said generally vertical axis, and said latch means including a second lever arm releasably engageable with said guiding handle for releasably restraining said guiding handle from pivotal movement about said generally horizontal axis.

17. A rear tined tiller as set forth in claim 16 wherein said latch means is movable between a first position wherein said first lever arm engages said frame and said second lever arm engages said guiding handle for restraining said guiding handle from pivotal movement, a second position wherein one of said lever arms is in engagement, and a third position wherein both of said lever arms are disengaged for permitting pivotal movement of said guiding handle about said horizontal axis and said vertical axis.

18. A rear tined tiller comprising:
a frame,
a wheel supporting the frame for movement on the ground,
a prime mover supported by the frame,
a plurality of tilling tines rotatably supported by said frame and driven by said prime mover, said tines engaging the ground for tilling,
a guiding handle,
means for connecting said guiding handle to said frame and for supporting said guiding handle for pivotal movement with respect to said frame and with respect to a generally vertical axis and in an arc of more than 90° and for pivotal movement about a horizontal axis, and
latch means for releasably restraining said guiding handle against pivotal movement, said latch means including a movable member movably connected between said frame and said handle for restraining said handle against pivotal movement with respect to said frame, said movable member comprising a lever including a first lever arm selectively engageable with said frame for restraining said handle for pivotal movement about said generally vertical axis and a second lever arm releasably engageable with said handle for selectively restraining said handle from pivotal movement about said horizontal axis, said lever being movable between a first position wherein said first lever arm engages said frame and said second arm engages said handle for restraining said guiding handle from pivotal movement, a second position wherein one of said arms is in engagement, and a third position wherein both of said arms are disengaged for permitting pivotal movement of said guiding handle about said horizontal axis and said vertical axis.

19. A rear tined tiller as set forth in claim 18 wherein said frame includes a plurality of arcuately spaced holes and said first lever arm selectively and alternatively engages one of said holes.

20. A rear tined tiller as set forth in claim 18 wherein said guiding handle includes an end plate at its end attached to said frame, said end plate being transverse to the longitudinal axis of said control handle and said end plate including a plurality of vertically aligned holes therein, said second lever arm being selectively and alternatively engageable with one of said vertically aligned holes.

21. A rear tined tiller comprising:
a rigid frame,
a wheel supporting the frame for movement on the ground,
a prime mover supported by said frame and fixed to said frame, a plurality of tilling tines rotatably supported by said frame and driven by said prime mover, said tines engaging the ground for tilling, a guiding handle, means for connecting said guiding handle to said frame and for supporting said guiding handle for pivotal movement with respect to said frame and with respect to a generally vertical axis in an arc of more than 90° and for pivotal movement about a horizontal axis, and a handle support means for supporting said guiding handle for rotation about a generally horizontal axis, said handle support connected to said frame for rotation about a generally vertical axis and in an arc of at least 180°, and latch means for releasably restraining said guiding handle against pivotal movement, said latch means including a movable member selectively connected to said frame and to said handle for selectively restraining said handle against pivotal movement with respect to said frame, said latch means being movable from a first position wherein said guiding handle is restrained against pivotal movement to a second position wherein said guiding handle is pivotable with respect to one of said axis, and a third position wherein said guiding handle is pivotable around both said generally vertical axes and said generally horizontal axis, said latch means including a first lever arm pivotally supported by said handle support and selectively engageable with said frame for restraining said handle support from pivotal movement about said generally vertical axis, and a second lever arm supported for movement with said first lever arm and releasably engageable with said guiding handle for releasably restraining said guiding handle from pivotal movement about said generally horizontal axis.

22. A rear tined tiller comprising a frame, a wheel supporting the frame for movement on the ground, a prime mover supported by the frame, a plurality of tilling tines rotatably supported by said frame and driven by said prime mover, said tines engaging the ground for tilling the soil, a guiding handle having opposite ends, one of said ends being connected to said frame, means for connecting said guiding handle to said frame and for supporting said guiding handle for pivotal movement with respect to a generally vertical axis and for pivotal movement about a horizontal axis, said connecting means including a handle support means for supporting said guiding handle for rotation about a generally horizontal axis, said handle support being connected to said frame for rotation about a generally vertical axis, latch means for releasably restraining said guiding handle against pivotal movement, said latch means including a movable member movably connected to said frame and engageable with said handle for restraining said handle against pivotal movement, a latch control lever connected to the other of said opposite ends of said guiding handle, said latch control lever being movable between a first lever position, a second lever position and a third lever position, and means for transmitting movement of said latch control lever to said latch means, said latch means including a first lever arm pivotally supported by said handle support means and selectively engageable with said frame for restraining said said handle support means from pivotal movement about said generally vertical axis, and a second lever arm releasably engageable with said guiding handle for releasably restraining said guiding handle from pivotal movement about said generally horizontal axis.

23. A rear tined tiller as set forth in claim 22 wherein said latch means is movable between a first position wherein said first lever arm engages said frame and said second lever arm engages said guiding handle for restraining said guiding handle from pivotal movement, a second position wherein one of said lever arms is in engagement, and a third position wherein both of said lever arms are disengaged for permitting pivotal movement of said guiding handle about said horizontal axis and said vertical axis.

24. A rear tined tiller comprising a frame, a wheel supporting the frame for movement on the ground, a prime mover supported by the frame, a plurality of tilling tines rotatably supported by said frame and driven by said prime mover, said tines engaging the ground for tilling the soil, a guiding handle having opposite ends, one of said ends being connected to said frame, means for connecting said guiding handle to said frame and for supporting said guiding handle for pivotal movement with respect to a generally vertical axis and for pivotal movement about a horizontal axis, latch means for releasably restraining said guiding handle against pivotal movement, said latch means including a movable member movably connected to said frame and engageable with said handle for restraining said handle against pivotal movement, a latch control lever connected to the other of said opposite ends of said guiding handle, said latch control lever being movable between a first lever position, a second lever position and a third lever position, and means for transmitting movement of said latch control lever to said latch means, said latch means including a lever pivotally supported and including a first lever arm selectively engageable with said frame for restraining said handle from pivotal movement about said generally vertical axis and a second lever arm releasably engageable with said handle for selectively restraining said handle from pivotal movement about said horizontal axis, said lever being movable between a first position wherein said first lever arm engages said frame and said second arm engages said handle for restraining said control handle from pivotal movement, a second position wherein one of said arms is in engagement, and a third position wherein both of said arms are disengaged for permitting pivotal movement of said control handle about said horizontal axis and said vertical axis.

25. A self-propelled tiller comprising:

a frame, a drive wheel supporting the frame for movement on the ground, a guiding handle, an engine supported by the frame, a plurality of tilling tines supported by the frame and engageable with the ground for tilling, traction drive means for selectively drivingly connecting said engine to said drive wheel for rotatably driving said drive wheel, said traction drive means being shiftable from a forward driving position to a neutral driving position to a reverse driving position, tine drive means for selectively drivingly connecting said engine to said tilling tines for rotatably driving said tilling tines, and drive control means connected to said traction drive means and to said tine drive means for precluding driving connection of said tilling tines with said engine unless said traction drive means is drivingly connected with said engine in forward driving engagement, and said drive control means including a shift lever connected to said traction drive means for shifting said traction drive means from said forward driving position to said neutral driving position and to said reverse driving position, and said shift lever being connected to said tine drive means for shifting said tine drive means to a drive mode when said traction drive means is shifted to said forward driving position and for shifting said tine drive means to a neutral mode when said traction drive is shifted to said neutral driving position for said reverse driving position.

26. The self-propelled tiller set forth in claim 25 wherein said drive control means includes a generally vertical shaft connected to said shift lever and connected to said traction drive means and to said tine drive means, and said generally vertical shaft having a longitudinal axis and movable longitudinally in response to shifting of said shift lever, and wherein said guiding handle is pivotable around said longitudinal axis of said generally vertical shaft.

27. The self-propelled tiller set forth in claim 26 wherein said guiding handle is pivotable more than 90° around said longitudinal axis of said generally vertical shaft.

28. The self-propelled tiller set forth in claim 25 wherein said engine includes a projecting crankshaft and a projecting camshaft and wherein said traction drive means includes a belt drivingly connected to said drive wheel for driving said drive wheel, a first pulley supported by said crankshaft and rotatably driven by said crankshaft, a second pulley supported by said camshaft and rotatably driven by said camshaft, a tensioning pulley supporting said belt and movable between a first position wherein said belt engages said first pulley and is driven by said first pulley to a second position wherein said belt engages said second pulley and is driven by said second pulley.

29. The self-propelled tiller set forth in claim 28 wherein said tine drive means includes a flexible driving member for selectively driving said tines, and movable means engageable with said flexible driving member for selectively causing said flexible drive member to drive said tines.

30. The self-propelled tiller set forth in claim 29 wherein said drive control means further includes shifting means connected to said tensioning pulley and connected to said movable means, said shifting means being movable between a first shift means position wherein said tensioning pulley is in said first tensioning pulley position and said movable member engages said flexible driving member for selectively causing said flexible drive member to drive said tines, and a second shift member position wherein said tensioning pulley is in said second tensioning pulley position and said movable means is disengaged from said flexible driving member.

31. The self-propelled tiller set forth in claim 30 wherein said shifting means includes a generally vertical shaft connected to said shift lever and having a longitudinal axis and movable longitudinally in response to shifting of said shift lever, and a lever assembly connected to said vertical shaft and connected to said first tensioning pulley and to said second tensioning pulley.

* * * * *